July 12, 1960 S. DOBA, JR 2,945,178

TELEVISION TRANSMISSION EVALUATOR

Filed Dec. 13, 1956 8 Sheets-Sheet 1

FIG. I

INVENTOR
S. DOBA JR.
BY Patrick J. Roche
ATTORNEY

July 12, 1960 S. DOBA, JR 2,945,178

TELEVISION TRANSMISSION EVALUATOR

Filed Dec. 13, 1956 8 Sheets-Sheet 2

INVENTOR
S. DOBA JR.
BY Patrick J. Roche
ATTORNEY

TELEVISION TRANSMISSION EVALUATOR

Filed Dec. 13, 1956 8 Sheets-Sheet 3

INVENTOR
S. DOBA JR.
BY Patrick J. Roche
ATTORNEY

TELEVISION TRANSMISSION EVALUATOR

Filed Dec. 13, 1956 8 Sheets-Sheet 4

INVENTOR
S. DOBA JR.
BY Patrick J. Roche
ATTORNEY

TELEVISION TRANSMISSION EVALUATOR

Filed Dec. 13, 1956 8 Sheets-Sheet 5

INVENTOR
S. DOBA JR.
BY Patrick J. Roche
ATTORNEY

INVENTOR
S. DOBA JR.
BY Patrick J. Roche
ATTORNEY

TELEVISION TRANSMISSION EVALUATOR

Filed Dec. 13, 1956 8 Sheets-Sheet 7

INVENTOR
S. DOBA JR.
BY Patrick J. Roche
ATTORNEY

TELEVISION TRANSMISSION EVALUATOR

Filed Dec. 13, 1956 8 Sheets-Sheet 8

INVENTOR
S. DOBA JR.
BY Patrick J. Roche
ATTORNEY

United States Patent Office 2,945,178
Patented July 12, 1960

2,945,178

TELEVISION TRANSMISSION EVALUATOR

Stephen Doba, Jr., Berkeley Heights, N.J., assignor to Bell Telephone Laboratories, Incorporated, New York, N.Y., a corporation of New York Filed Dec. 13, 1956, Ser. No. 628,147

12 Claims. (Cl. 324—57)

This invention relates to the testing of broadband transmission systems and, more specifically, to apparatus whereby the quality of such a system can be evaluated rapidly and with a minimum of auxiliary equipment.

It is an object of the invention to effect a rapid and comprehensive test of a broadband transmission system.

It is a further object of the invention to simplify the performance testing of television transmission circuits without requiring subjective interpretation on the part of the operator.

It is a still further object of the invention to effect the evaluation of the transmission quality of a broadband system by a direct meter reading.

In the performance testing of transmission circuits having wide pass bands for use in the transmission of picture information, it has heretofore been customary either to measure transmission and phase characteristics or the transient response under static or non-operational conditions by individual tests, or by means of the transmission of test patterns to determine the dynamic or operational performance of the circuit. These tests require considerable subjective judgment on the part of the observer because of the difficulty of defining precise performance standards.

As a means of avoiding these difficulties, there is provided, in accordance with this invention, equipment for forming a sharp rectangular pulse at line scanning rate to be applied to the transmission system and for weighting and summing the distortions of this pulse produced in the transmission system in such a manner that a single figure of merit indication is obtained. A method of analyzing the distortions of the test pulse produced in the transmission system can be based on the echo principle. As suggested in an article by H. A. Wheeler entitled "The Interpretation of Amplitude and Phase Distortion in Terms of Paris of Echoes," which appeared in the June 1939 edition of the Proceedings of the Institute of Radio Engineers at page 359, the essence of the echo principle is that departures from constant attenuation and linear phase in a transmission ssytem manifest themselves in the form of echoes. Distortions of shape similar to the signal and displaced positively or negatively from it are the result of these departures. If the test signal consists of a narrow pulse, the effect of transmission deviations is indicated by a number of narrow pulses of varying amplitude and displaced in time on either side of the test pulse. Furthermore, if the test pulse is narrow enough, the individual echoes are likewies narrow and hence easily distinguishable from each other and from the main pulse.

It has been found that although much of the echo energy is considerably lower than that of the random noise energy present in the transmission system, the fact that the echoes repeat at frame rate produces a steady "ghost" picture, which impairment to the television picture is far greater than the effect of random noise energy of comparable power. In accordance with this invention, this noise-to-echo disadvantage is overcome by a sampling and integrating process which results in direct addition of the echo part of the received signal and in substantial cancellation of the random noise components.

Also in accordance with this invention, the echo energy is weighted before summation of the energy present in two different respects so that only that part of the echo energy which has been determined to be of importance in the impairment of picture quality is considered. By a process of time weighting, the sampled echoes are operated on by an appropriate factor which not only suppresses in large measure the energy present in the main test pulse but also multiplies the echoes selectively depending on their time displacements from the main pulse. By a second process of frequency weighting higher frequency components of the echo energy are attenuated progressively more than the low frequency components. The time and frequency-weighted echo energy is finally summed and measured on a thermocouple meter. The thermocouple meter reading then gives a measure of the energy present in the time and frequency-weighted echoes and, by comparison with the energy of the main test pulse, indicates the quality of transmission.

As will be readily perceived by those skilled in the art, the above-described system operates on the amplitude and phase distortions introduced by irregularities in the transmission medium by making measurements in the time domain. It is also evident that analogous results can be obtained by employing a test signal varying in the frequency domain and then adapting thereto the principles of time and frequency weighting and single meter indication in accordance with this invention. Accordingly, there is also disclosed in this specification an alternate system for obtaining the desired meter indication which employs a sweep frequency test signal rather than a pulse signal recurring at line scanning rate.

Irregularities in a transmission medium for a television signal impair the ultimate picture. These defects are important only as they can be seen as a degradation of the picture. Thus, the correlation between transmission deviations and picture quality depends on what the human eye sees or thinks it sees. The form of the time and frequency functions described above is an attempt to put into working form an apparatus which reponds to these transmission deviations on the same relative basis as the average human observer. The direct meter reading representative of the summed echo energy in the received signal effectively enables a "Good-Bad" indication of the echo quality of the transmission medium to be obtained.

It is an important feature of the invention that the test signal is generated entirely by electronic means so that the equipment may be made highly compact and easily portable.

It is another important feature of the invention that a qualitative evaluation of the operational performance of the transmission medium may be obtained in a minimum of time of the order of one minute.

This invention will be more fully understood by reference to the specific embodiments illustrated in the drawings and the following description. In the drawings.

Figure 7:
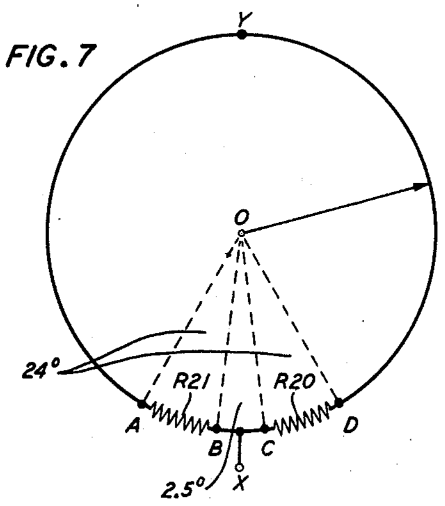
Figure 8:
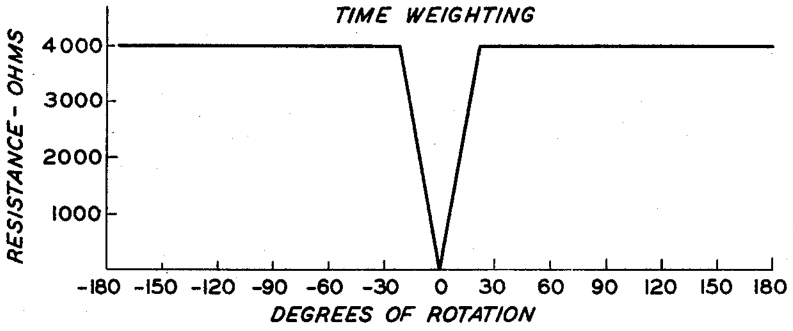
Figure 9:
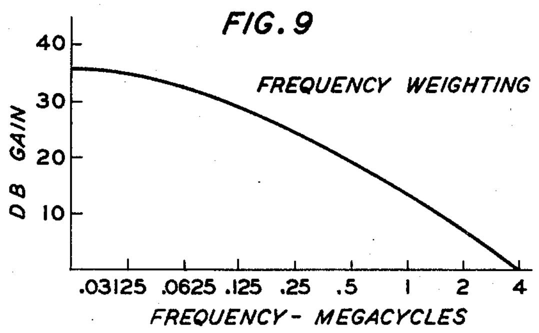
Figure 10:
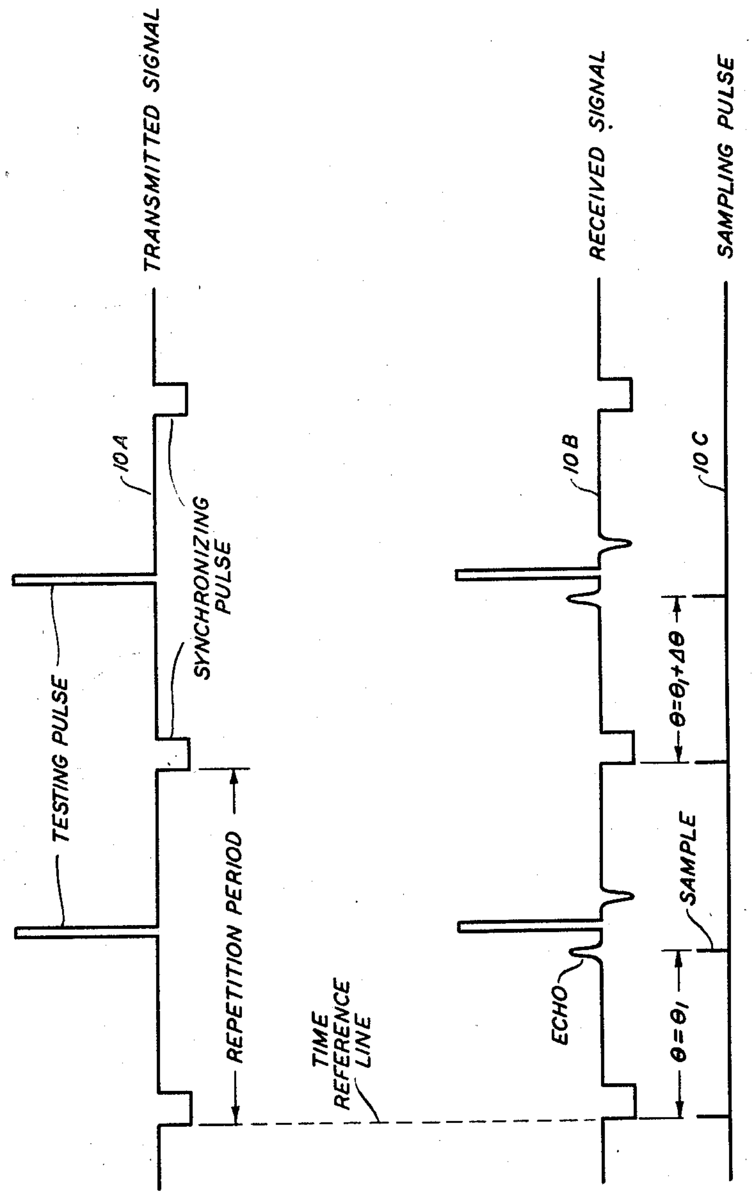
Figure 11:
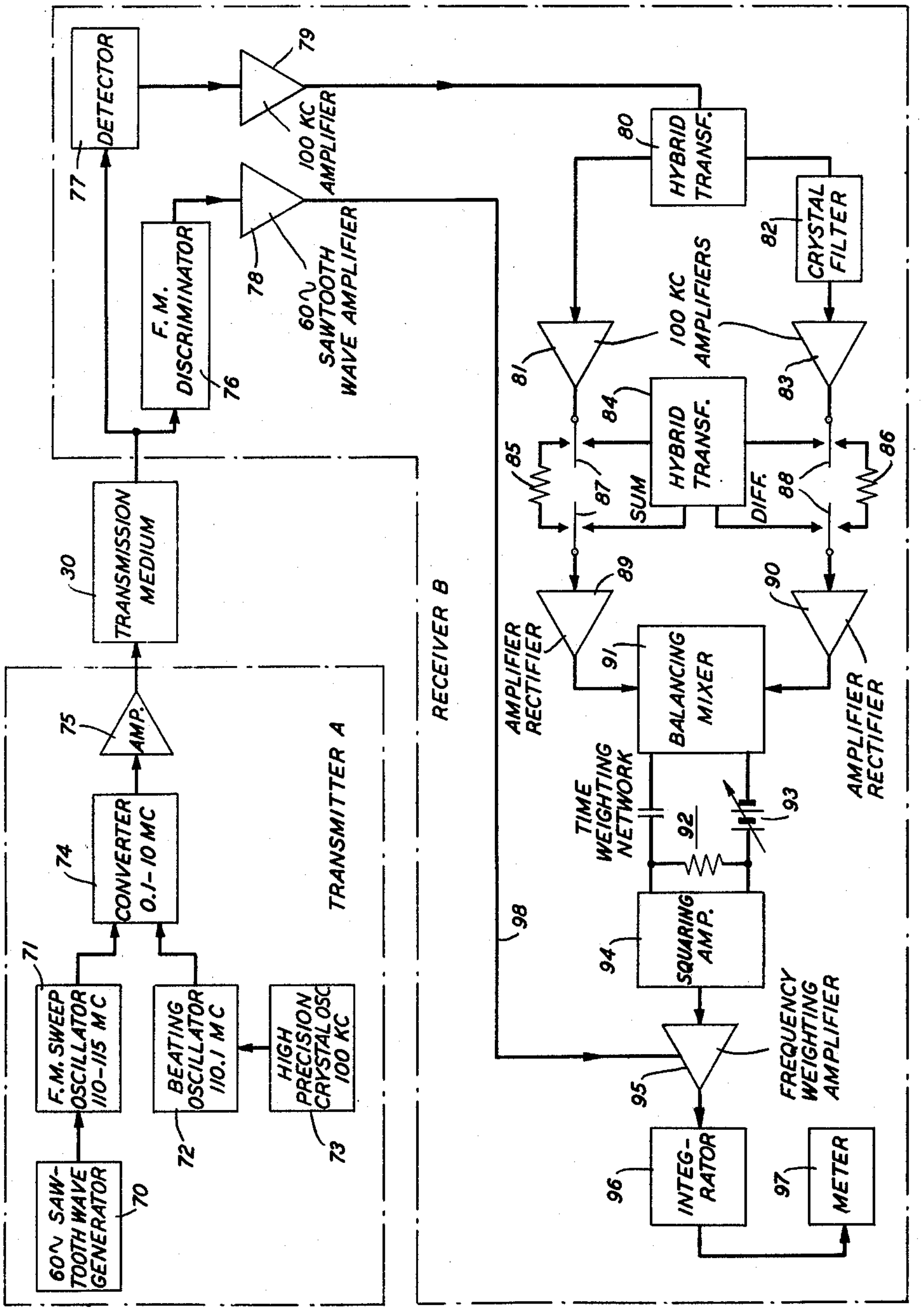

Figs. 3, 4, 5 and 6 together constitute a complete schematic diagram of the receiver section of the apparatus;

Fig. 7 is a schematic diagram showing the details of the time-weighting potentiometer useful in the practice of the invention;

Fig. 8 is a diagram representative of the time-weighting function;

Fig. 9 is a diagram representative of the frequency-weighting function;

Figs. 10A, 10B and 10C are diagrams of the sampling method employed in the illustrative embodiments; and Fig. 11 is a block diagram of an alternate transmission evaluator in accordance with this invention employing a swept frequency test signal.

Figure 1:
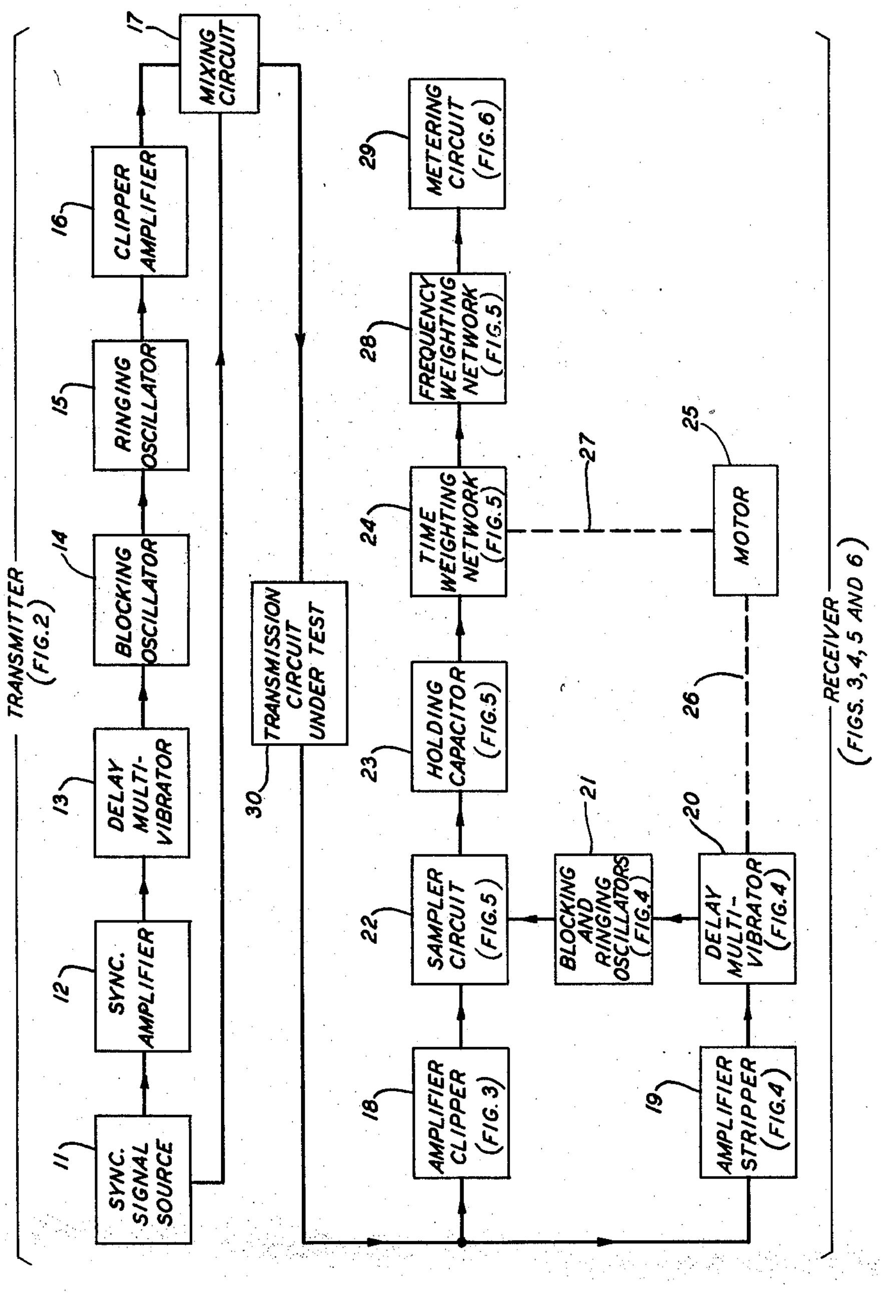
Fig. 1 is a block schematic diagram of a transmission evaluator apparatus in accordance with this invention employing pulse techniques.

Fig. 1 represents in block form a complete illustrative embodiment of the transmission evaluator including both the transmitter and receiver sections. Blocks 11 through 17 represent the transmitter, or test pulse generating, section; block 30, the transmission circuit being tested, which may be a coaxial cable or radio relay link; and blocks 18 through 29, the receiver, or echo analyzing sections.

The transmitter section comprises a synchronizing signal source 11, such as a horizontal drive pulse generator operating at line scanning rate. Pulses from signal source 11, after suitable amplification in synchronizing pulse amplifier 12, trigger delay multivibrator 13 to produce test pulses about midway between the synchronizing pulses. In order to produce sharp, narrow test pulses, the output of multivibrator 13 is applied to a blocking oscillator 14, which in turn drives a ringing oscillator 15 which tends to oscillate at a very high frequency. The damped output of ringing oscillator 15 is a sharp pulse, which sufficiently overdrives clipper ampylifier 16 to result in a test pulse about 0.1 microsecond wide and 2 volts peak amplitude at a repetition rate of 15.75 kilocycles per second. In mixing circuit 17 synchronizng pulses of one polarity and about 25 percent of test pulse amplitude are combined with test pulses of opposite polarity to form the complete test signal as shown in Fig. 10A. The recombination of the sychronizing pulses with the test pulses is necessary in some systems to maintain transmission. The output of mixing circuit 17 is applied to the transmission circuit under test 30, whose transmission irregularities produce a characteristic echo pattern which is analyzed in the receiver section of the transmission evaluator.

The receiver section amplifies the test pulse and its echoes and by a unique sampling and integration process transforms the time scale from 63.5 microseconds per cycle to 2 seconds per cycle in order to reduce the effect of random noise from the transmission circuit, which otherwise is a factor limiting the accuracy of the measurement. Subsequently the time-weighting and frequency-weighting functions are applied and the remaining echo energy is measured as power.

The received signal is applied to amplifier-clipper 18 and amplifier-stripper 19. Amplifier-clipper 18 is a four-stage video amplifier having about 50 decibels of gain. Both the test and synchronizing pulses are clipped by about 20 decibels by means of crystal diodes in order to facilitate the amplification of the echoes.

The output of amplifier-clipper 18 is fed into sampler circuit 22, which comprises primarily a diode circuit direct-current biased sufficiently in the reverse directon to prevent transmisison except in the presence of a sampling or gating pulse which overrides the bias. The sampling pulse, about 0.1 microsecond wide, is derived from motor-controlled delay multivibrator 20. Delay multivibrator 20 is triggered by pulses derived from the synchronizing pulse by way of amplifier-stripper 19, which strips the test pulse from the received signal. The delay of multivibrator 20 is a function of a slowly varying grid bias, which is controlled cyclically by a motor 25 operating at 30 revolutions per minute. Motor 25 is mechanically coupled by shaft 26 to the movable arm of a potentiometer in the grid circuit of multivibrator 20.

The lagging edge of the delay output pulse is used to trigger blocking and ringing oscillators 21 to produce a narrow 0.1 microsecond sampling pulse. The sampling pulse is fed into one winding of a three-winding pulse transformer in the sampler circuit 22, and opens or energizes this circuit once every 63.5 microseconds. However, because of the variable delay incorporated in multivibrator 20, the relative time in the 63.5 microsecond cycle during which the sampler gate is open is selected to cover the range from 10 microseconds preceding the test pulse to 20 microseconds lagging. Because it requires two seconds (at 30 revolutions per minute) to scan the 30-microsecond interval, an expanded time scale results. Without the use of this sampling technique, the echo energy desired to be measured would be overridden by noise.

The output of sampler circuit 22 charges the holding capacitor 23, which acts as a storage device during sampling intervals. The potential of the holding capacitor 23 is impressed on the grid of a cathode follower, which feeds the time-weighting network 24. The time-weighting network 24 is a specially constructed potentiometer shown in Fig. 7 which progressively attenuates the echoes close to the main test pulse, say within the range of ±2 microseconds of the main pulse. These close-in echoes are suppressed and not considered in the overall echo energy because they are largely masked by the main pulse and have little distorting effect on the ultimate picture as far as the average human observer is concerned. The pontetiometer is also center-tapped to ground (at point X in Fig. 7) for the width of the main pulse so that the main pulse is largely suppressed in the time weighting network. (See the multiplying function illustrated in Fig. 8.) The sliding arm of the potentiometer is driven continuously by the same motor 25 through coupling 27 that drives the grid bias control on delay multivibrator 20. The two drive shafts 26 and 27 must be synchronized in the initial line-up of the apparatus.

Following the time-weighting network 24 is the frequency-weighting network 28 which is an adjustable resistance-capacitance network for progressively attenuating the higher frequency components of the echo energy at the rate of about 6 decibels per octave as shown in Fig. 9. It has been found that the higher frequency components have progressively less distorting effect on the ultimate picture and need not be considered. Because the time stretching effect of the sampler circuit reduces the equivalent top frequency of four megacycles per second in the received signal to 60 cycles per second, the frequency-weighting network parameters are selected with 60 cycles per second as the top frequency.

The final step in the evaluation of the echo energy found to be of interest is that of measuring the average power. Block 29 indicates the metering circuit, in which a thermocouple meter performs the power-averaging function.

Figure 2:
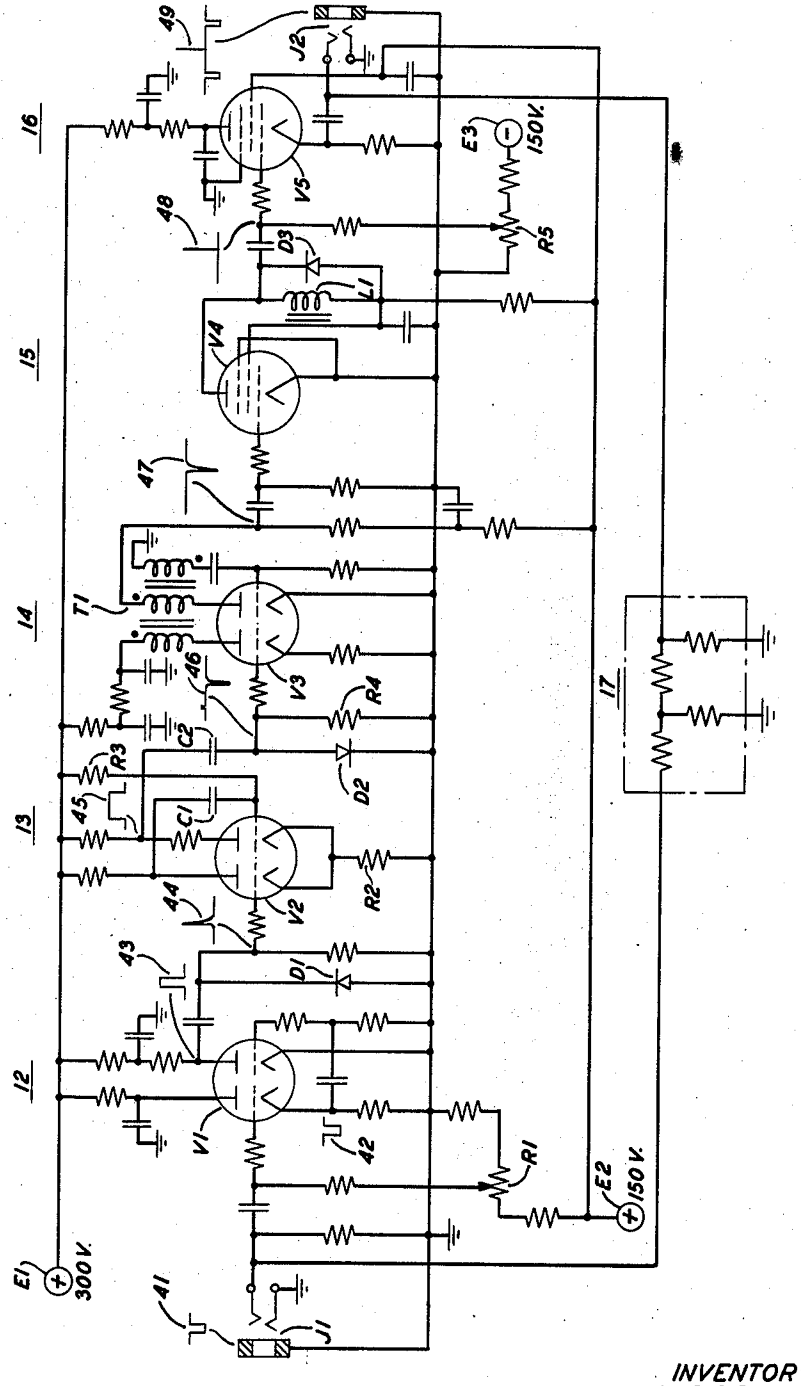
Fig. 2 is a complete schematic diagram of the transmitter section of the apparatus.

Fig. 2 shows in detail the circuit used in the illustrative embodiment of a transmitter section of the transmission evaluator. A synchronizing pulse generator, such as is used in conventional television transmission stations, delivers a two microsecond triggering pulse at horizontal line scanning frequency of 15.75 kilocycles per second to jack J1. Waveform 41 is representative of an acceptable synchronizing pulse. Vacuum tube V1 comprises a conventional two-stage pulse amplifier connected as a cathode follower in the first stage for buffering purposes. Adjustable grid bias potentiometer R1 is connected between a ground connection point and positive potential point E2 for adjusting the gain of the first stage to accommodate different synchronizing pulse levels. The output at the first cathode of V1 is represented by waveform 42. The second half of V1 is connected as a conventional amplifier with output pulse 43 taken from the second plate.

Tube V2 with its associated components is a conventional cathode-coupled delay multivibrator triggered by the leading edge of output pulse 43. A differentiating network coupling the plate of V1 to the first grid of V2 supplemented by the clamping diode D1 insures that only a positive pulse 44 triggers the multivibrator. The first half of V2 is normally biased to cut-off by the potential developed across common cathode resistor R2 due to the normally conducting second half of V2, which has its grid returned to positive potential source E1 through resistor R3. The application of a positive pulse to the first grid of V2 switches the first half of V2 to the conducting state and at the same time cuts off the second half in a well known manner. The second half of V2 remains cut off while coupling capacitor C1 discharges through the first half of V2 and raises the potential at the grid of the second half of V2 to the cut-off bias level. An output pulse 45, having a width equal to half the repetition period, results when the values of R2 and C1 have been properly chosen. Output pulse 45 is differentiated by capacitor C2 and resistor R4 coupling tubes V2 and V3, as indicated by waveform 46. Diode D2 poled as shown insures that only the trailing edge of output pulse 45 is available to trigger block oscillator tube V3.

The negative-going trailing edge of pulse 45 coupled to the grid of the first section of V3 cuts off this tube section and causes a collapse of the magnetic field in pulse transformer T1 connected in the plate circuit. This collapse generates a pulse at the grid of the second section of V3 which turns this section on abruptly. An amplified output pulse 47 is in turn generated across the third winding of transformer T1 and this pulse is coupled to the control grid of tube V4. In the plate circuit of tube V4 is a coil L1 shunted by a crystal diode D3. The application of the strong negative pulse 47 cuts off tube V4 rapidly and shocks coil L1 into a very high frequency oscillation. But due to the damping effect of diode D3 only the first half-cycle of the oscillation (waveform 48) is passed to the grid of tube V5. Thus, an extremely narrow pulse of about 0.1 microsecond width is produced in the output of tube V5, which is connected as a cathode follower. By means of adjustable resistor R5 the negative bias on the grid of V5 obtained from potential source E3 is set to produce a unit pulse output.

Synchronizing pulses from input jack J1 are mixed in the output at jack J2 by means of mixing circuit 17 which may comprise a simple T-pad as shown. The constants of mixer 17 are chosen so that the synchronizing pulse is about 25 percent of the test pulse amplitude as shown in waveform 49.

While a specific pulse generating circuit has been described in detail as the transmitter for the transmission evalutor, it is to be understood that many other combinations well known in the art could have been used. Many of the components which have well known functions, such as the antiparasitic resistors in the grid circuits, have not been discussed.

Figure 3:
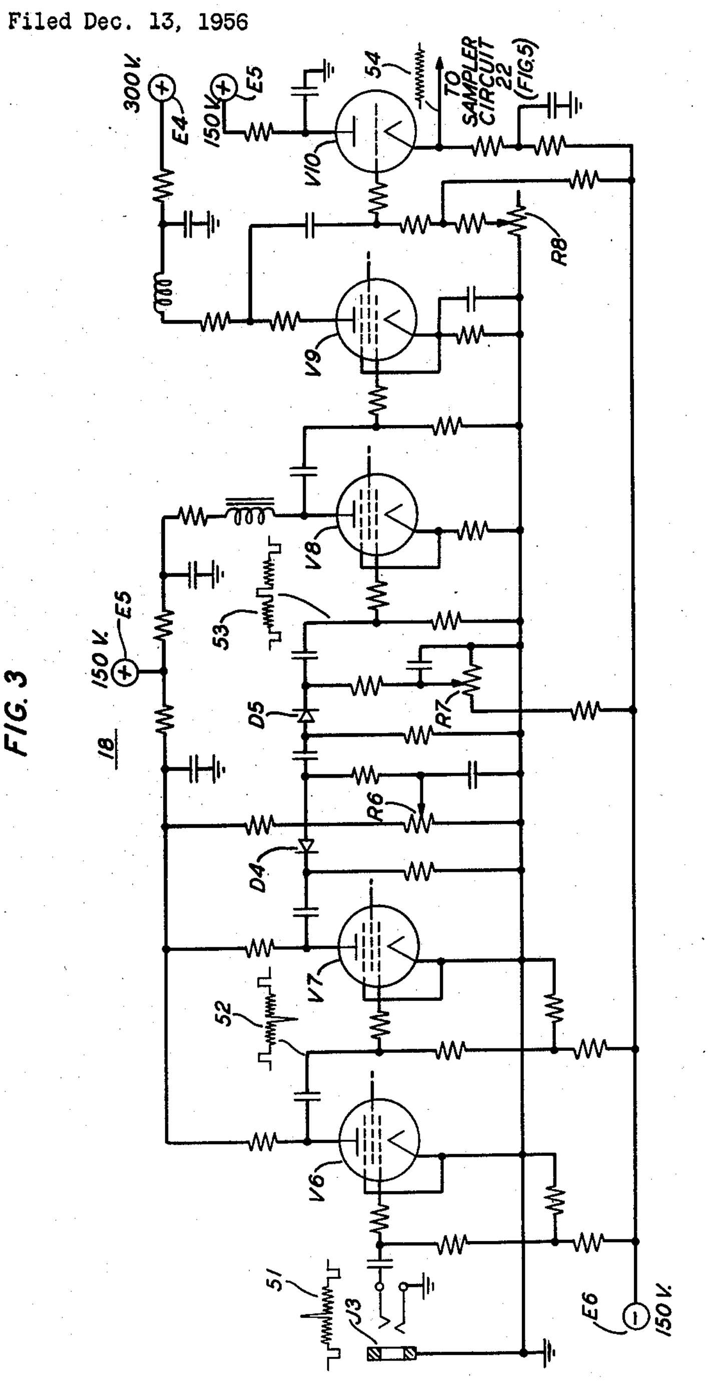

Figs. 3, 4, 5 and 6 show in similar detail the circuits of the receiver section of the transmission evaluator. In Fig. 3 the received signal represented by waveform 51, showing the echo energy on either side of the main pulse, is coupled through input jack J3 and a coupling capacitor to the control grid of tube V6. Tubes V6, V7, V8 and V9 comprise a conventional four-stage resistance-coupled amplifier employing pentodes. About 50 decibels of gain is realized in these stages. Screen-grid connections are omitted for simplicity. In the interstage circuit between tubes V7 and V8 crystal diode clippers D4 and D5 are employed to clip the main test pulse and synchronizing pulses down to the level of the echo energy. A positive bias is applied to diode D4 by means of adjustable resistor R6 connected across positive potential source E5, and similarly a negative bias is applied to diode D5 through adjustable resistor R7 connected to negative potential source E6. The settings of R6 and R7 control the clipping level in a well known manner. Waveforms 52 and 53 approximate the waveshapes at the intermediate points indicated on the drawing.

The output tube V10 is connected as a cathode follower to drive the sampler circuit described below in connection with the description of Fig. 5. The output waveform is approximated at 54. Adjustable resistor R8 controls the bias on tube V10 and hence the output level.

Figure 4:
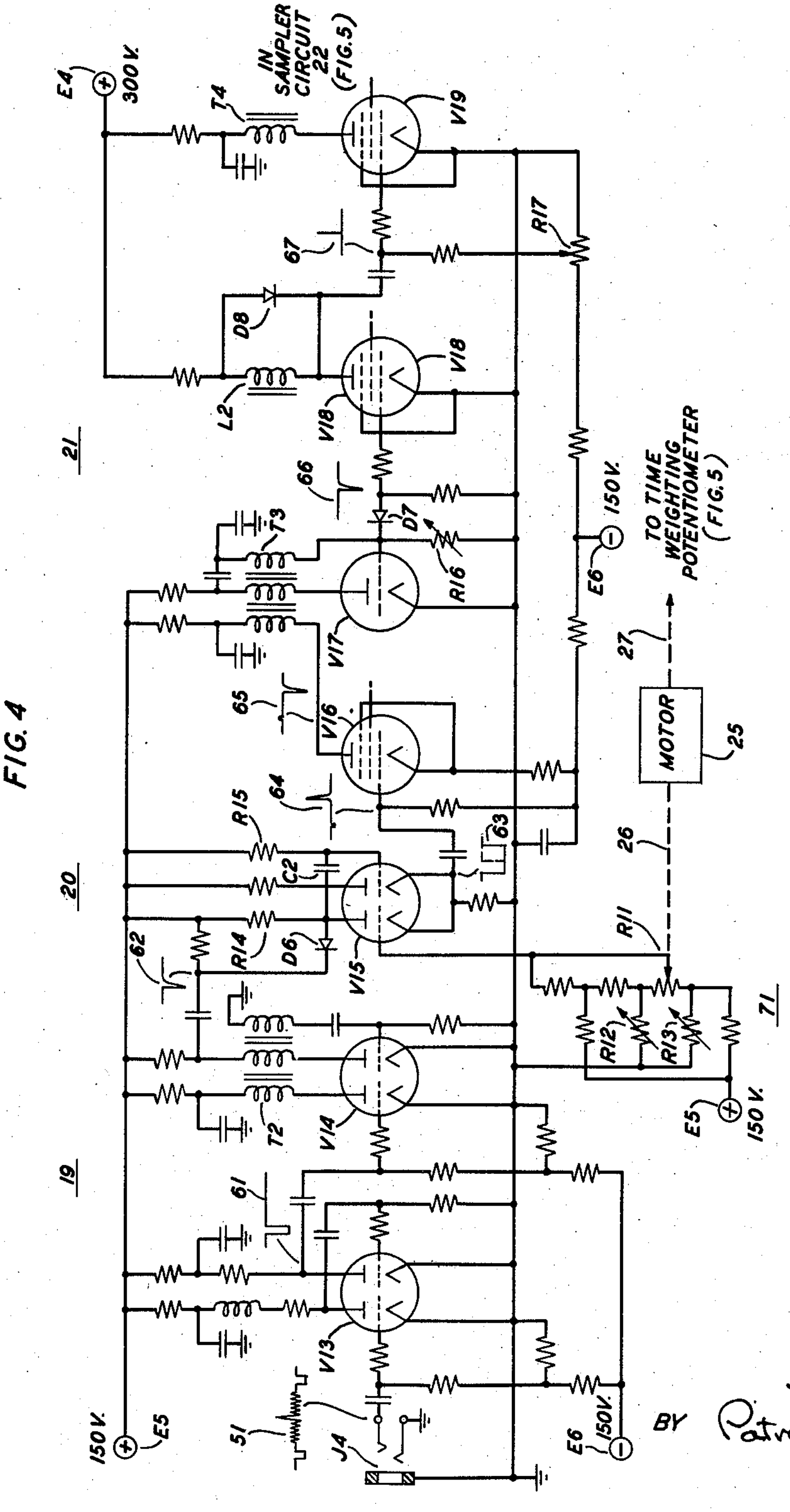

Fig. 4 shows in detail the sampling pulse generating circuit of the receiver section. To input jack J4 is supplied the same signal represented by waveform 51 as is received at jack J3 in Fig. 3. Tube V13 constitutes a conventional two-stage triode amplifier for increasing the level of the received signal sufficiently to drive the blocking oscillator comprising the following tube V14 and associated components. Blocking oscillator tube V14 is essentially the same in function as tube V3 in Fig. 2. A strong negative pulse (waveform 62) is developed across the output winding of pulse transformer T2 in synchronism with the leading edge of the amplified synchronizing pulse 61 at the output of tube V13.

The output pulse 62 drives variable delay multivibrator tube V15 which produces a variable width pulse 63. The circuit associated with tube V15 comprises a one-shot cathode-coupled multivibrator, such as is described on page 170 of "Waveforms," by B. Chance et al. (McGraw-Hill Book Company, Inc., 1949). The first section of V15 is normally on and the second section is normally off. A negative pulse applied to the plate of the first section through diode D6 allows the plate voltage to rise and this rise is coupled to the grid of the second section through capacitor C2. This turns the second section on and because of the increase in the current through the common cathode resistor, the first section is cut off. Capacitor C2, which had been charged up through grid resistor R15 from positive potential source E5, now slowly discharges through the now conducting second half of V15, plate resistor R15 and the common cathode resistor until the cathode potential rises sufficiently to allow the first section to turn on again.

Bias for the grid of the first half of V15 is obtained from potential source E5 through a network 71. Network 71 comprises a voltage dividing circuit including a potentiometer R11 and adjustable resistors R12 and R13 connected to the end points of R11. Resistors R12 and R13 are set to provide a bias such that the discharging time of capacitor C2 raises the cathode potential to the cut-off level for V15 at 10 microseconds before the main pulse and 20 microseconds following, respectively. The movable arm of R11, driven at a 30 revolution-per-minute rate by motor 25 varies the bias on V15 continuously between these end points. The result is that the width of the output pulse varies continuously. Output pulse 63 derived from the cathode of multivibrator tube V15 is differentiated, amplified and inverted in following tube V16. Input and output waveforms are shown as 64 and 65. In order to produce a sharp sampling pulse a blocking oscillator and ringing oscillator combination as described in connection with the transmitter section of Fig. 2 is used. Tube V17 is the blocking oscillator tube having a pulse transformer 73 to supply the feedback. Only the trailing edge of the multivibrator pulse is used to trigger the blocking oscillator tube V17. Ringing oscillator tube V18 is in turn shocked into oscillation by the fact that negative pulse 66 abruptly cuts off the tube. Coil L2 in the plate circuit of tube V18 with its distributed capacity attempts to break into oscillation, but after the first half-cycle the oscillation is damped by shunting diode D8. A narrow sampling pulse 67 about 0.1 microsecond wide is generated in the output of V18.

The output stage of the sampling pulse generating circuit is the tube V19, which has the primary of pulse transformer T4 connected in its plate circuit. The secondaries of transformer T4 are shown in Fig. 5.

Figure 5:
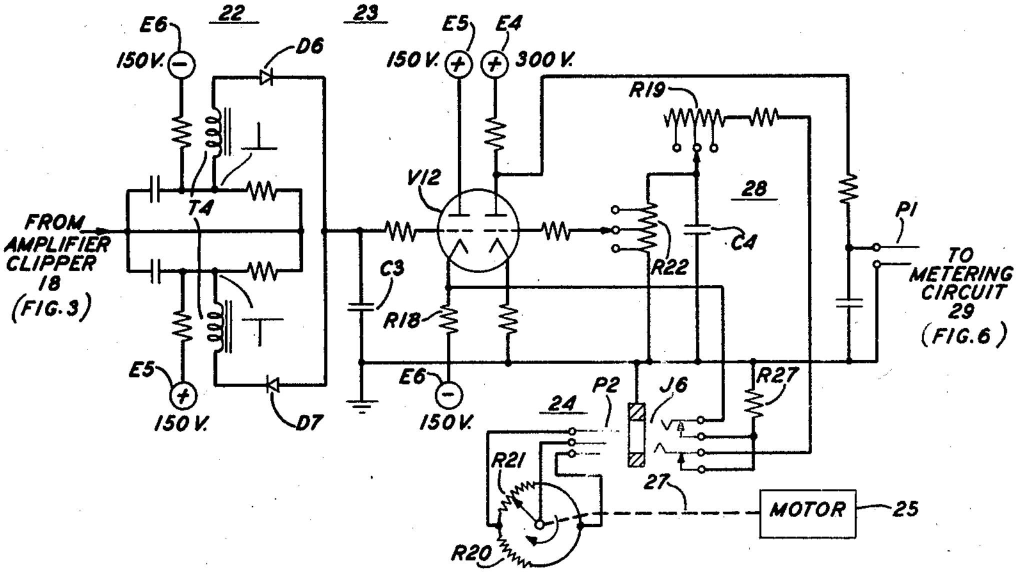

Fig. 5 is a detailed schematic diagram of the sampling, time weighting, and frequency-weighting networks. The sampling network comprises two series of biased diodes D6 and D7 poled in opposite directions and connected in parallel for longitudinal transmission. One series of diodes, represented by D6, is poled to conduct toward tube V12, and the other series of diodes D7 is poled to conduit in the opposite direction. Each series of diodes actually comprises two or more crystal diodes and a vacuum tube diode in series in order to prevent high frequency leakage in the absence of a sampling pulse. The crystal diodes have a relatively low front-to-back resistance ratio but a very low capacitance. The vacuum tube diodes, on the other hand, have a very high front-to-back ratio, but comparatively high capacitance. The combination makes for a more nearly ideal switch.

Diode D6 is reverse biased by a negative potential of 25 to 30 volts from potential source E6, while diode D7 is correspondingly reverse biased by a positive potential from source E5. In series with each of the diodes is a winding of the gating pulse transformer T4. Both output windings are so connected that the sampling pulse overcomes the steady reverse bias on the diodes and forward biases them into conduction. The sampling circuit, therefore, acts as a switch under the control of the sampling pulses. Transmission of the echo energy from the amplifier-clipper of Fig. 3 occurs solely during sampling pulse intervals. Because the sampling pulse varies in time relative to the main pulse, the complete received signal, exclusive of the synchronizing pulses, is sampled once every two seconds. Each sample charges up holding capacitor C3 to the instantaneous level of the portion of the received signal being sampled. The potential across the capacitor C3 thus changes in 63.5 microsecond steps, the interval between sampling pulses.

Inasmuch as the echo pattern is steady whereas the noise pattern is random, successive samples of the echoes add directly whereas successive samples of noise may sometimes cancel as well as add. Therefore, the potential across the holding capacitor varies more in accordance with the echo energy than with the noise energy, thus producing a net signal-to-noise advantage.

The first section of tube V12 is connected as a cathode follower directly coupled to the holding capacitor C3. Therefore, the potential across the cathode resistor R18 is proportional to the potential of the holding capacitor.

The time-weighting network is connected between the cathode of the first section of V12 and ground and the movable arm is driven through shaft 27 by motor 25, as previously explained, in synchronism with the variable delay multivibrator bias potentiometer R11 in Fig. 4. Resistive portions R20 and R21 attenuate echo energy close in to the main pulse and during the time the sliding arm traverses the grounded portion between B and C on Fig. 8 the main pulse is suppressed entirely. The time-weighting network is shown provided with a plug P2 for engaging jack J6 for convenience in effecting the initial adjustment of the circuit as more fully described below.

The time-weighted output is next supplied to the frequency-weighting network 28 comprising series resistor R19 and shunt capacitor C4. As previously mentioned, the higher frequency components are attenuated at the rate of 6 decibels per octave. R19 is shown with taps which may be changed to vary the weighting characteristics if desired.

Across the output of the frequency-weighting network is a tapped attenuator R22 used in setting up the apparatus.

The attenuated output across R22 is direct-coupled to the second half of tube V12 and amplified therein to drive the metering circuit. The weighted output appears at plug P1, which is provided as an accommodation in the event that an oscillogram of the weighted output is desired. An oscilloscope with a motor-driven 30 revolution-per-minute sweep suffices to make a visual observation.

Figure 6:
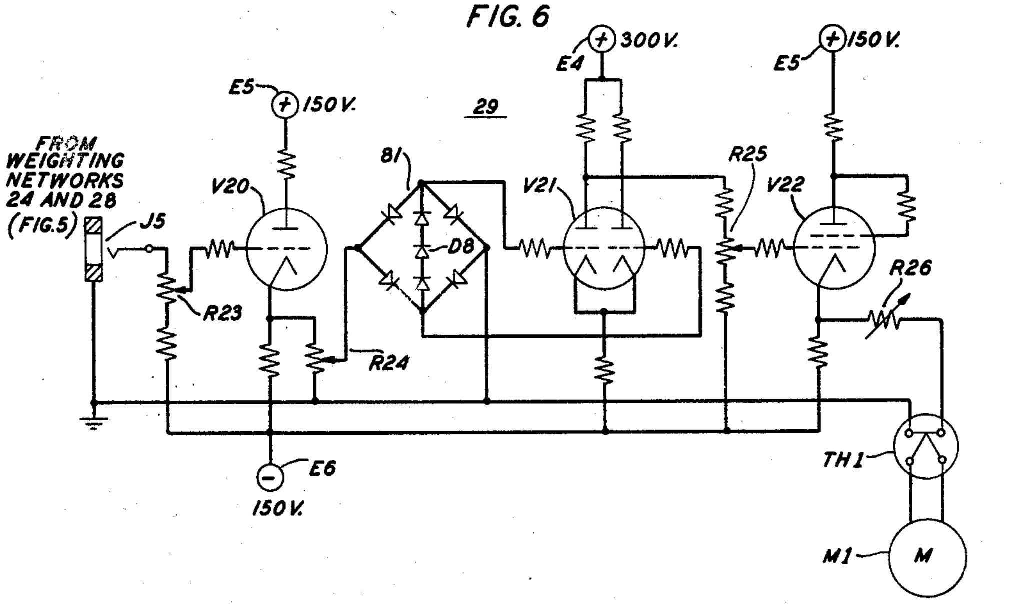

Plug P1 also is connectable to jack J5 shown in Fig. 6 so that the direct current output of the weighting circuits may be measured. Because the four-megacycle echo signal in the original received signal has been translated in the sampling circuit to a sixty-cycle signal, direct current amplifiers are employed to drive the measuring meter M1. Triode tube V20 amplifies the echo output of the weighting circuit and applies it to the linear bridge rectifier 81. Adjustable resistors R23 and R24 in the grid and cathode circuits, respectively, of tube V20 are gain and balancing controls for the direct current amplifier. In order to simplify the output tube operation for positive and negative echoes, the bridge rectifier 81 is used to give a unidirectional voltage wave form. The rectifier is connected between the output of tube V20 and the balanced grids of tube V21. The series of diodes D8 in the vertical diagonal of the bridge improves the linearity of the bridge for small applied voltages. Without D8 the rectified output would be extremely non-linear due to the fact that the bridge arm diodes cannot be accurately matched. However, the series of diodes D8 (which actually consisted of five diodes in a specific embodiment) exhibits similar resistance variations which, on a statistical basis, largely cancels out the non-linearity of the bridge arm diodes.

The improvement in linearity of the bridge rectifier by incorporating diodes D8 in the output diagonal can be demonstrated as follows. That the forward impedance of a dry rectifier is not constant with applied voltage is well known. Let V be the output voltage appearing across the output diagonal $Z_L$ of a bridge rectifier employing non-linear dry rectifiers having forward impedances $Z_F$ and reverse impedances $Z_R$.

Then the output voltage V may be expressed in terms of the input voltage E as follows:

$$V=E\frac{Z_L(Z_R-Z_F)}{Z_L(Z_F+Z_R)+2Z_RZ_F} \quad (1)$$

Provided that the reverse impedance $Z_R$ greatly exceeds the forward impedance $Z_F$, $$V=E\frac{Z_L}{Z_L+2Z_F} \quad (2)$$

From an inspection of Equation 2 it is apparent that the ratio of output voltage V to the input voltage E is not constant if $2Z_F$ varies with E and is commensurate with $Z_L$. If $Z_L$ is replaced by $nZ_F$, where $n$ is any positive integer, that is, the load impedance $Z_L$ is replaced by a series of diodes (such as D8 in Fig. 6) appropriately poled, the non-linearity apparent in Equation 2 is largely compensated.

Substitution of $nZ_F$ in place of $Z_L$ in Equation 2 yields $$V=E\frac{n}{n+2}Z_R\gg Z_F \quad (3)$$

Equation 3 shows that the ratio of output voltage V to input voltage E is now constant for all values of E, a substantial improvement over Equation 2.

Only one-half the output of balanced amplifier V21 is taken from the plate of the first section of the tube and this puts a positive signal on the grid of the output cathode follower tube V22. Resistor R25 is a level adjusting potentiometer in the grid circuit of output tube V22. In the cathode circuit of tube V22 is connected a thermocouple T*h*1, which has a time constant of about fifteen seconds and is rugged enough to withstand the relatively high peak power in the amplifier echoes. Although the combined time constant of the thermocouple and meter M1 is not quite long enough to give complete smoothing of the meter reading, it does, however, represent a reasonable compromise between a slow steady reading and a faster, relatively unsteady reading. Resistor R26 can be adjusted as needed to set the zero of the meter.

In order to make a measurement with the system, it is necessary to make a preliminary balance check on the receiver section. Referring to Fig. 5, the cathode output of V12A, driving the time-weighting network 24, must be at ground potential when no signal is being received. This requirement is due to the fact that the time-weighting circuit relies on a direct current ground to furnish suppression of the main pulse. This cathode potential is set by adjustment of variable grid bias resistor R8 (Fig. 3) in the grid circuit of tube V10. The direct current balance is also important at the input of the rectifier bridge (R24 in Fig. 6) and the output to the thermocouple meter (R25 in Fig. 6).

For conducting a measurement, the signal from the transmitter section is passed through the transmission circuit under test and applied to the input jack J3 (Fig. 3) of the receiver section at a constant reference level of one volt peak-to-peak. This level is adjusted by manipulation of control R5 in the transmitter section of Fig. 2. For this purpose a peak-reading voltmeter is temporarily connected at jack J3. The output of the receiver then gives a meter reading which is a measure of the time weighted and frequency weighted distortions of the test pulses.

In order for the meter reading to be interpreted in terms of the energy in the test pulse a calibrated attenuator is interposed between the transmission circuit and the receiver input and adjusted to some reference reading on the meter. The time weighting potentiometer is then disconnected and replaced by a 2000 ohm resistor R27 so that the meter M1 measures the frequency weighted test pulse energy. The input attenuator loss is increased to obtain the same reference meter reading as before. The measure of the distortions, or echo energy, is then the difference in attenuator settings. Assuming that the meter has been calibrated in decibels and that it has just been determined from the input attenuator that the echo energy in the time weighted and frequency weighted distortions is 40 decibels down from the test pulse energy, the attenuator R22 (adjustable in two-decibel steps, for example) at the output of the frequency weighting network 28 (Fig. 5) and resistor R26 (Fig. 6) in series with the heater of the thermocouple *Th1* are adjusted to cause the meter to indicate 40 decibels. The input attenuator used for calibration can now be removed and the time weighting network reconnected. The meter should still read 40 decibels and, if so, the evaluator is calibrated. Now, all that is necessary for subsequent measurements is to keep the input to the receiver section at one-volt peak and the meter then reads the weighted echo energy in terms of the test pulse energy.

An alternate arrangement for the determination of the characteristics of a transmission medium is one using, instead of a pulsed test signal, a constant level swept frequency signal. Such a signal may be one in which the instantaneous frequency varies linearly with time between a very low frequency of a few kilocycles per second and a relatively high frequency of several megacycles per second continuously at an audio frequency rate. The frequency range swept is the transmission band under consideration for the medium being tested.

If the transmission system under test were distortionless, i.e., were characterized by a constant loss and linear phase over the frequency band of interest, the received signal would be a replica of the transmitted signal delayed from the transmitted signal by a constant amount. However, for a system introducing frequency-dependent distortions, the received signal is in effect a carrier of frequency varying over the range of interest and having superimposed thereon a modulation envelope varying in amplitude in accordance with the relative amplitudes of the echoes. The periodicity of this modulation envelope varies inversely with the time displacement of the echoes.

Fig. 11 shows in block diagrammatic form a system for the automatic evaluation of amplitude and phase deviations occurring in the transmission medium, using a swept frequency test signal. At transmitter A (enclosed in dashed lines) a frequency-modulated sweep oscillator 71 is periodically swept through a predetermined frequency range such, for example, as the range between 110 and 115 megacycles per second. A voltage control wave of the sawtooth form is supplied in a well-known manner from 60-cycle sawtooth wave generator 70. Sixty cycles is used merely as a matter of convenience beacuse it is generally available from a commercial power supply. Sweep frequency oscillator 71 can be of the reactance tube controlled type well known in the art.

Since the range of frequencies generally employed in coaxial transmission media under consideration lies between zero and five megacycles per second, a beating oscillator 72 is employed and its output, having a frequency of 110 megacycles per second, is introduced together with the output of sweep oscillator 71 into converter 74, thereby to provide an output which is regularly cycled, under the control of sawtooth wave generator 70, between a low frequency of a few kilocycles per second to ten megacycles per second. Any of the numerous appropriate types of beating oscillators available to the art may be used.

In order to provide a suitable reference and test signal to which will be imparted in the transmission medium the phase and amplitude variations it is desired to measure, the 110 megacycle per second frequency of beating oscillator 72 is itself modulated by the 100-kilocycles per second output of a high precision constant frequency crystal oscillator 73, before being combined in converter 74 with the output of sweep oscillator 71 to produce a double modulated carrier wave as a test signal.

The output of converter 74 is further amplified and certain phase adjustments, if needed, may be effected in this amplifier to compensate for the average phase distortion of the medium. The output of amplifier 75 is introduced into the near end of transmission medium 30.

The units of the transmitter A just described are well known in the art and are shown, for example, in United States Patent No. 2,625,614 issued to J. C. Schelleng on January 13, 1953.

At receiver B is Fig. 11, the approximate zero to ten megacycle per second signal arrives over transmission system 30 and is applied to a frequency modulation discriminator 76 of any well-known type to recover the 60-cycle per second sawtooth wave, which is employed for synchronization purposes as later described in this specification. The received signal is also applied to detector 77 and the 100-kilocycle test signal with its sidebands so derived is passed to amplifier 79.

The output of amplifier 79 is split into two paths by the first hybrid transformer 80. Each of these paths provides amplification of the 100-kilocycle per second test signal and are substantially identical except for the fact that one of the paths includes a narrow band crystal filter 82 passing only the single frequency of 100 kilocycles per second and effectively eliminating any sideband frequencies adjacent to 100 kilocycles per second, such as 100 kilocycles ±60 cycles per second. Therefore, an undistorted sine wave reference signal is made available for comparison with the distorted signal obtained over the other path.

The reference and distorted signals may now be conveyed to amplifier-rectifiers 89 and 90 over one of two paths depending on whether gain or phase distortions are to be measured. When measuring gain distortion, the reference and distorted signals are compared on an amplitude basis by operating switches 87 and 88 to bypass hybrid transformer 84 and connect through resistors 85 and 86. The outputs of amplifier-rectifiers 89 and 90 are combined in balanced detector 91 to produce an output proportional to the difference in amplitude between the reference and distorted signals.

When phase distortion is being measured, the switches 86 and 87 are operated to feed the reference and distortion signals through second hybrid transformer 84 to obtain two outputs equal to the vector sum and vector difference between the two signals. The vector sum is applied to amplifier-rectifier 89 and the vector difference to amplifier-rectifier 90. The output from the balancing mixer is then proportional to the instantaneous phase difference between the reference and distorted signals.

The phase and gain measuring system just discussed is of the type described and shown in greater detail in a paper by H. P. Kelly appearing in Transactions of the American Institute of Electrical Engineers, vol. 73, at page 565 (November 1954).

The output from the balancing mixer 91 is then applied to the time-weighting network 92. The elements of this network include a capacitor and a resistor. For phase measurements the input wave is applied to the capacitor and the output is obtained across the resistor as shown in Fig. 11. For gain measurements, the condenser and resistor are interchanged. The time constant of the combination is chosen so as to produce attenuation of echo energy with a time displacement less than two microseconds. The time-weighting network is much simpler in the sweep frequency measuring system because the instantaneous frequency is proportional to time and hence a simple frequency dependent network serves to produce the required time-weighting function.

Following the time-weighting network is a squaring amplifier 94 for producing an output proportional to the square of the input and thus independent of the polarity of the input. A zero adjustment, indicated by battery 93, operates in conjunction with the squaring amplifier 94 to so bias the amplifier as to produce a zero output when measureing phase in the case of a distortionless transmission medium.

The squared output of amplifier 94 is applied to a variable gain amplifier 95, the gain of which is varied in synchronism with the derived 60-cycle per second sawtooth wave from amplifier 78 over line 98. The varying bias is applied in such a way as to cause the amplifier 95 to operate at maximum gain at the low frequency end of the swept range and to decrease in gain progressively in accordance with the curve of Fig. 9 to perform the frequency-weighting function.

The squared and weighted output of amplifier 95 is next applied to the integrating amplifier 96, which may be a high-gain direct-current amplifier with capacitive feedback having the property that its output voltage is proportional to the time integral of the input voltage. Such amplifiers are well known in the art and an example may be found described in Proceedings of the Institute of Radio Engineers, May 1947, pages 444 through 452. The output of the integrating amplifier is proportional to the sum of the transmission deviation either amplitude-wise or phase-wise depending on the setting of switches 87 and 88. This output level is indicated on the meter 97, which may be of the thermocouple type, and is therefore a measure of the quality of the transmission system and may be so evaluated.

Alternatively, the output of the integrating amplifier 96 may be applied to a recording meter of a suitable type to produce a continuous record of the transmission deviations.

While the invention has been described and illustrated in connection with two specific embodiments, it will be realized that many embodiments are possible within the spirit and scope of the invention. It is further to be understood that while the invention has been described primarily in connection with the testing of circuits intended for the transmission of television signals, it is by no means limited to such use. The invention is useful as well in the testing of circuits intended to be utilized for the transmission of signals having a wide frequency spectrum and particularly those in which intelligence is conveyed by means of energy pulses.

What is claimed is:

1. In a testing system for a broadband transmission circuit having a sending end and a receiving end remote from each other and in which signal energy is transmitted during discrete time intervals recurring at a finite repetition rate, means for generating a test signal comprising sharp rectangular pulses occurring at said finite repetition rate, means for supplying said test signal to said sending end, means for deriving at said receiving end a test output including phase and amplitude distortions appearing as positive and negative displacements in time of said test signal at said repetition rate, means for sampling the derived test output including said distortions at a rate slow compared to said repetition rate over finite time intervals both leading and lagging said test signal, and means connected to the output of said sampling means for evaluating the quality of transmission in said broadband circuit in terms of the energy in the output of said sampling means.

2. In a testing system for a television transmission circuit having a sending end and a receiving end remote from each other, means for generating a test signal comprising sharp rectangular pulses at the frequency of the line scanning rate, means for supplying said test signal to said sending end, means for deriving at said receiving end a test output including phase and amplitude distortions appearing as positive and negative displacements in time of said test signal at said line scanning rate, means for sampling the derived test output including said distortions at the rate of approximately 30 times per minute over finite time intervals leading said test signal by at least ten microseconds and lagging said test signal by at least twenty microseconds, and means for evaluating the quality of transmission in said television circuit in terms of the energy in the output of said sampling means.

3. In combination, a synchronizing pulse generator for producing a continuous train of pulses at a predetermined repetition rate, means controlled by said train of pulses for producing delayed test pulses at said repetition rate, means for mixing said synchronizing pulses and said delayed test pulses to form a test signal, a transmission circuit to be tested, means for supplying said test signal to said transmission circuit and for deriving therefrom a test output comprising said test signal and distortions thereof in the form of echoes of said test pulses at said repetition rate, means supplied with said test output for amplifying said test output and for clipping said test and synchronizing pulses, means supplied with said test output for producing a gating pulse at said repetition rate cyclically varying in time with respect to said synchronizing pulse at a low frequency rate, means supplied with the output from said amplifying and clipping means and with said gating pulse for sampling the echo energy in said test output at said low frequency rate whereby echo energy is enhanced as compared to random noise energy in said test output, means supplied with said sampled echo energy for storing and integrating said echo energy between sampling intervals, means supplied with the output of said storing means for suppressing said test pulse and for weighting said echo energy in accordance with its time displacement from said test pulse, means supplied with the output of said weighting means for attenuating the high frequency components of said echo energy more than the low frequency components whereby the relatively greater importance of low frequency components in causing impairment of a signal transmitted through said transmission circuit is evaluated, and means supplied with the output of said attenuating means for measuring the power in said attenuated output whereby a single figure of merit for the quality of said transmission circuit is obtained.

4. The combination in accordance with claim 3 in which the cyclical variation of said gating pulse and the operating of said weighting means are controlled and synchronized by the rotation of a single drive motor.

5. The combination in accordance with claim 4 in which said drive motor includes means for controlling its speed of rotation at a rate of thirty revolutions per minute.

6. The combination in accordance with claim 4 in which the said power measuring means is a thermocouple meter driven by a direct current amplifier and a full wave rectifier bridge.

7. The combination in accordance with claim 6 in which said rectifier bridge comprises asymmetrically conducting devices in the bridge arms and in the output diagonal, whereby a linear relation between input and output is preserved for small signal levels.

8. In a testing system for a broadband transmission circuit, the combination of means for generating a recurring test signal having frequency components covering the transmission band of said transmission circuit, means for applying said test signal to one end of said transmission circuit, means at the other end of said transmission circuit for deriving only distortion energy from said test signal, and means for measuring the derived distortion energy comprising at least a first circuit means for weighting said derived distortion energy in accordance with the time of occurrence of said derived distortion energy in said recurring test signal, second circuit means for weighting said derived distortion energy in accordance with the frequency components of said recurring test signal, and means for indicating the total derived distortion energy after said time and frequency weighting thereof.

9. In a testing system for a broadband transmission system, means for deriving a carrier whose frequency is modulated by a first signal so as to sweep over the band of frequencies normally transmitted over said transmission system and centered about said carrier, means for additionally modulating said carrier by a second highly stable single frequency signal, means for introducing said doubly modulated carrier into the input end of said transmission system, demodulating means at the output end of said transmission system for recovering said first signal and said second signal, a first frequency selective means to isolate from said first signal a signal representing the sweep cycle, a second frequency selective means to isolate frequencies representing said second signal and sideband frequencies thereof representative of distortions resulting from passing through said system, a third frequency selective means to strip said sideband frequencies from said selected second signal with said sideband frequencies present, means for comparing said stripped second signal with the distortions in said second signal including said sidebands and obtaining a third signal indicative of the distortions represented by said sideband frequencies, means for weighting said third signal in accordance with the displacement in time of said distortions from said stripped second signal, means for frequency weighting said time-weighted third signal in accordance with the frequency components therein, said frequency weighting means being synchronized with the recovered signal representative of said sweep cycle, and means for indicating the time integral of said time and frequency weighted distortions.

10. The system according to claim 9 in which said distortions are amplitude variations, and in which said third signal is obtained by comparing said selected second signal stripped of sidebands on an amplitude basis with said selected second signal including said sidebands.

11. The system according to claim 9 in which said distortions are phase variations and in which the means for obtaining said third signal comprise first means for deriving from said stripped second signal and said second signal including said sidebands fourth and fifth signals representing respectively the sum and difference of said one second signals and second means for combining said fourth and fifth signals whereby said third signal represents the instantaneous phase difference between said two second signals.

12. The system according to claim 9 in which said time weighting means comprises a capacitor in series with a resistor and in which said frequency weighting means comprises an amplifier biased so as to have progressively less gain at the high frequency end of said sweep cycle than at the low frequency end in synchronism with said derived sweep signal.

References Cited in the file of this patent

UNITED STATES PATENTS

| | | |
|---|---|---|
| 2,477,023 | Weaver | July 26, 1949 |
| 2,578,348 | Gannett | Dec. 11, 1951 |
| 2,625,614 | Schelleng | Jan. 13, 1953 |
| 2,800,627 | Oudin et al. | July 23, 1957 |

OTHER REFERENCES

Wheeler: "The Interpretation of Amp and Phase Distortion in Terms of Pairs of Echoes," 1939, IRE, 359, TK 5700 17.

Beck: "Microwave Testing With Millisecond Pulses," Radio-Engineering, May 1955, pages 13–15 and 23.